United States Patent
Goodman et al.

(10) Patent No.: US 8,509,408 B2
(45) Date of Patent: Aug. 13, 2013

(54) VOICE AND TEXT COMMUNICATION SYSTEM

(75) Inventors: Lee N Goodman, Tyngsboro, MA (US); Sujin C Chang, Stow, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1275 days.

(21) Appl. No.: 12/335,112

(22) Filed: Dec. 15, 2008

(65) Prior Publication Data

US 2010/0150333 A1   Jun. 17, 2010

(51) Int. Cl.
- *H04M 3/42* (2006.01)
- *H04M 11/00* (2006.01)
- *H04W 4/14* (2009.01)
- *G10L 15/26* (2006.01)
- *G10L 13/08* (2006.01)

(52) U.S. Cl.
USPC ........... 379/201.01; 379/88.16; 379/201.1; 455/466; 704/235; 704/260; 704/E13.001

(58) Field of Classification Search
USPC ....... 379/201.01, 201.02, 207.02; 455/412.1, 455/412.2, 414.1, 466; 704/235, 260, E13.001, 704/88.01, 88.16, 201.1
See application file for complete search history.

(56) References Cited

U.S. PATENT DOCUMENTS

| | | | |
|---|---|---|---|
| 7,512,217 B2 * | 3/2009 | Greenwood | 379/88.14 |
| 7,702,792 B2 * | 4/2010 | Shaffer et al. | 709/227 |
| 2003/0135569 A1 * | 7/2003 | Khakoo et al. | 709/206 |
| 2005/0198096 A1 * | 9/2005 | Shaffer et al. | 709/200 |

* cited by examiner

*Primary Examiner* — Harry Hong

(57) ABSTRACT

A text/voice system comprises a device configured to receive an incoming voice call intended for a called party, and detect, in response to receiving the voice call, the current status of the called party on a text messaging system, where the current status may include active or inactive. The device is also configured to establish a communication session between the calling party and the called party via the text messaging system, where speech from the calling party is translated to text and delivered to the called party during the communication session, and responsive text from the called party is translated to speech and delivered as speech to the calling party during the communication session.

20 Claims, 6 Drawing Sheets

VOICE AND TEXT COMMUNICATION SYSTEM

BACKGROUND

Voice-based communication and text-based communication are two increasingly accessible forms of communication available. This is evident from the expanding use of cell phones for both voice and text communication, as well as the increasing membership in online text-based instant messaging, including in online social networks, such as MySpace and Facebook, that include voice and text networking features. Despite the expanding availability of voice-based and text-based communications systems, the two types of systems tend to remain separate from each other.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention to the exemplary embodiments disclosed herein.

A voice and text communication system, described herein, may permit communication between voice-based communication systems and text-based communication systems in real time. The aim of the voice and text communication system is not only to provide new services, but all the services, current and future, that voice-based communication systems and text-based communication systems provide. For example, voice-based communications systems may permit voice conversations to occur in real time, and text-based communications systems may permit text-based conversations to occur in real time. Thus, the voice and text communication system gives users the flexibility to communicate in real time in either medium, with users of either medium.

Implementations described herein may permit telephone voice callers to communicate with others in real time via text, whether the others are using a telephone or not. While the description herein will focus on instant messaging, the description is not so limited. The description may equally apply to any system of text-based communication. Text-based communication, as used herein, may refer to real time (or near-real time) text communication, such as short message service (SMS) communication, as is common in cell telephone networks. Further, text-based communication may refer to Internet-based instant messaging communication systems, and/or Internet-based chat room communication. Text-based communication may further include distributed role-playing games incorporating instant messaging and/or chat room communication features. Text-based communication may also comprise electronic mail, including electronic mail systems that incorporate instant messaging technology. An example of a text message might include a string of characters and/or certain other information, including graphics, depending on the capabilities of the specific text messaging systems used.

Figure 1:
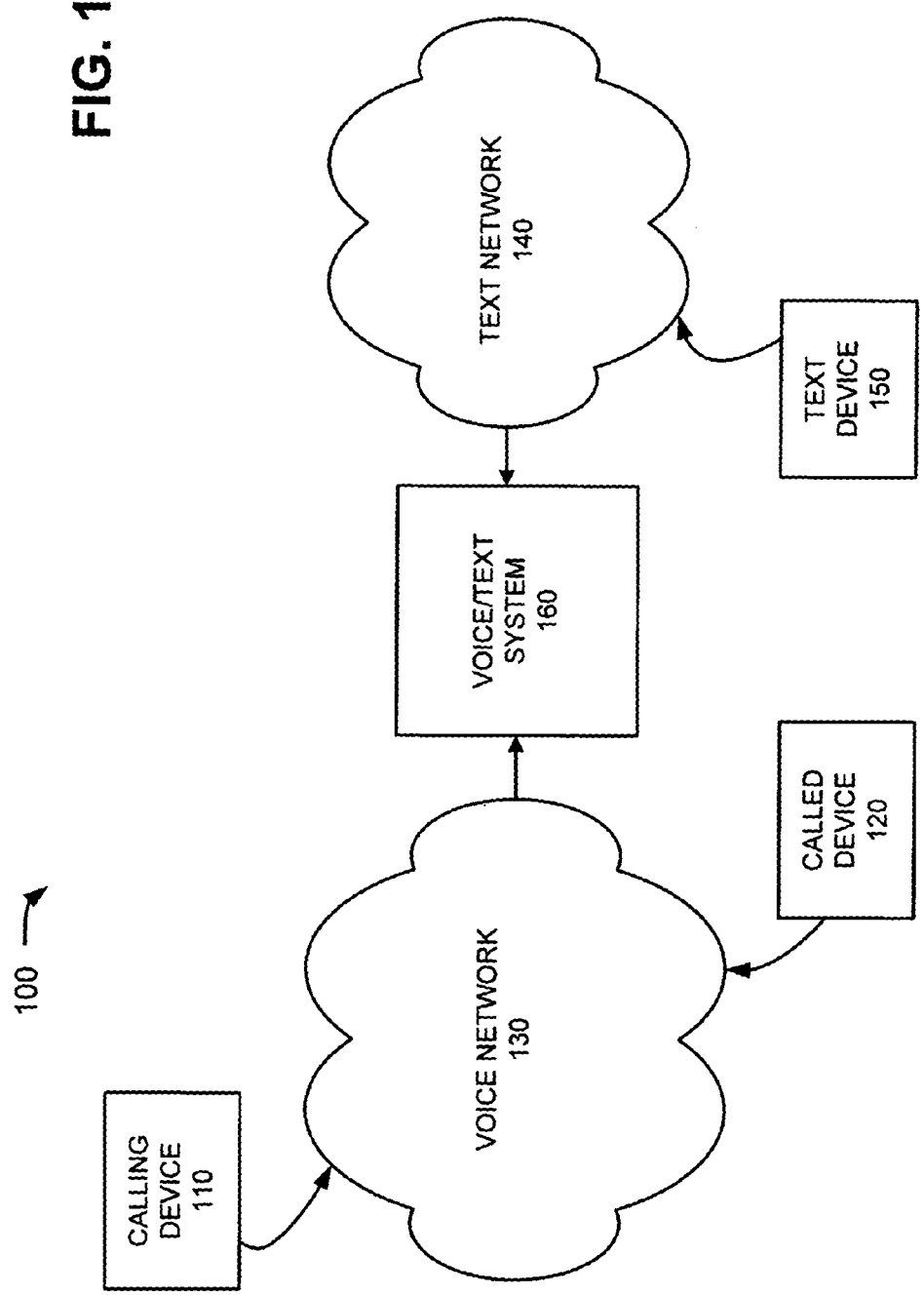
FIG. 1 is a diagram that illustrates an overview of an implementation of the system described herein.

FIG. 1 is a diagram that illustrates an overview of an implementation of the system described herein. As shown in FIG. 1, environment 100 may include calling device 110, called device 120, voice network 130, text network 140, text device 150, and voice/text system 160. In practice, environment 100 may include more, fewer, different, or differently arranged devices than are shown in FIG. 1. Also, two or more of these devices may be implemented in a single device. For example, called device 130 may include text device 150. Further, a single device may be implemented as multiple, distributed devices. While FIG. 1 shows direct connections between devices and networks, any of those connections may be indirect connections made through other devices and/or networks.

Calling device 110 and called device 120 may include any type of communication or computing device capable of making voice telephone calls. For example, calling device 110 and called device 120 may include a digital landline telephone, a mobile phone, or a personal computer, such as a desktop computer, a laptop computer, or a personal digital assistant (PDA). Voice network 130 may include any telephone network. For example, voice network 130 may include the Public Switched Telephone Network (PSTN), a mobile phone network, a Voice Over Internet Protocol (VOIP) network, a private telephone network, or a combination of networks. Calling device 110 and called device 120 may connect to voice network 130 via wired and/or wireless connections. Text network 140 may be any network that permits text-based communication. For example, text network 140 may include an SMS-enabled mobile phone network, an Internet-based instant messaging network, or an Internet-based chat room network. Text device 150 may include any device for communicating via text messaging. For example, text device 150 may include a text messaging-enabled telephone or PDA, or a computer with instant messaging capability. Text device 150 may connect to text network 140 via wired and/or wireless connection. Voice/text system 160 may include a device that may facilitate real time (or near-real time) voice-to-text and/or text-to-voice communication. In one implementation, voice/text system 160 may operate in conjunction with both voice network 130 and text network 140. Voice/text system 160 may connect to voice network 130 and text network 140 via wired and/or wireless connections.

Figure 2:
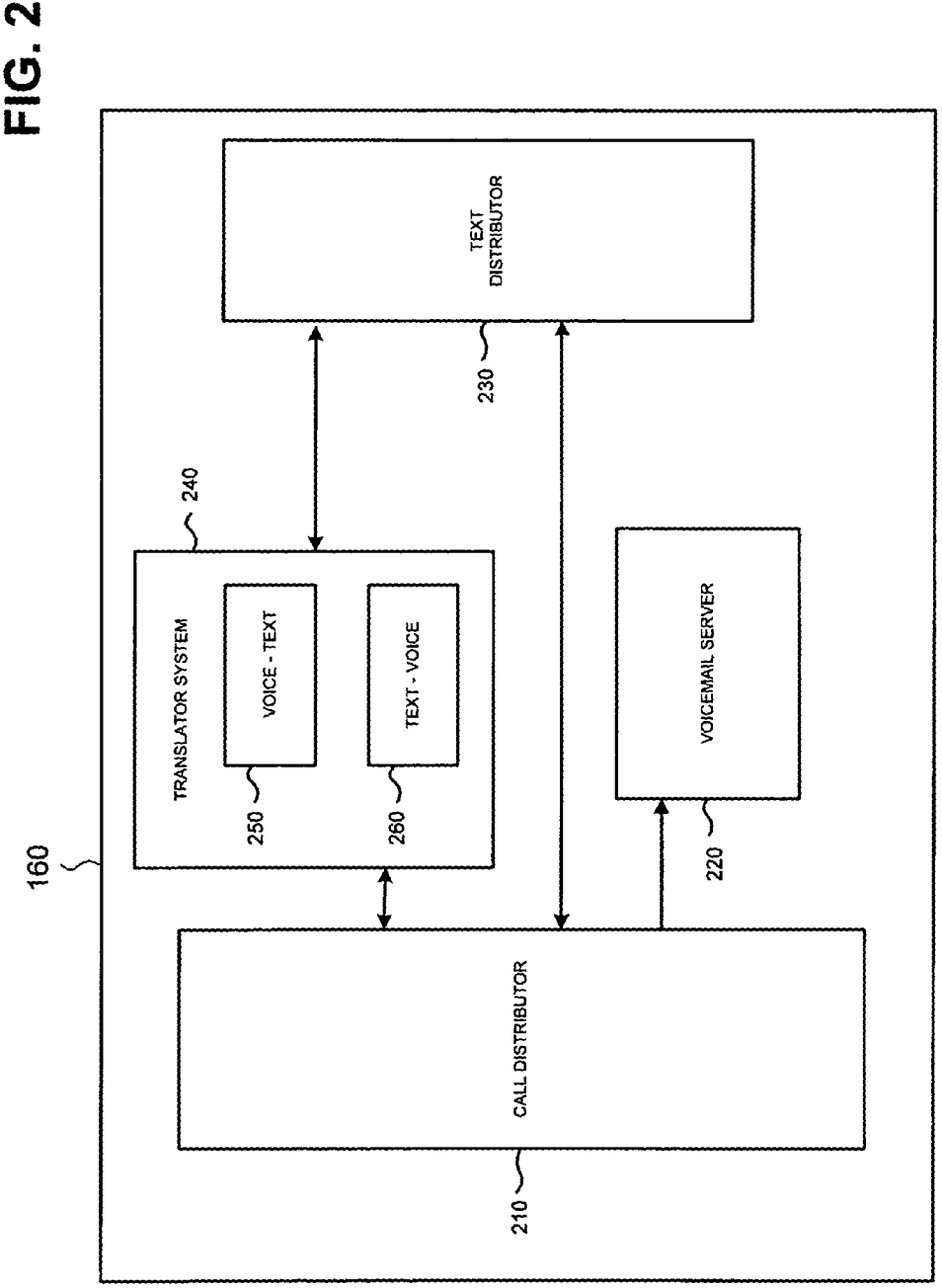
FIG. 2 is a diagram that illustrates an exemplary voice/text system configured to operate in the exemplary system depicted in FIG. 1.

FIG. 2 is a diagram that illustrates an exemplary voice/text system configured to operate in the exemplary system depicted in FIG. 1. As shown in FIG. 2, voice/text system 160 may include call distributor 210, voicemail server 220, text distributor 230, and translator system 240. Translator system 240 may include voice-to-text translator 250 and text-to-voice translator 260.

Call distributor 210 may include any device for receiving, directing, or processing incoming telephone calls. For example, in one implementation, call distributor 210 may include an automatic call distributor that receives an incoming call, directs the incoming call to the called number, and monitors the call for a connection.

Voicemail server 220 may include any device for receiving, storing, transmitting, and/or processing voicemail messages.

For example, voicemail server 220 may include an automated response unit that provides a greeting to a caller and prompts the caller to leave a message. Voicemail server 220 may be configured to store substantially any number of messages, and the stored messages may be associated with substantially any number of calling and called parties.

Text distributor 230 may include any device for receiving, storing, transmitting, and/or processing text messages. For example, text distributor 230 may include an automatic text message distributor that receives an incoming text message, directs the incoming text message to the intended receiver, and monitors the directed message for delivery.

Translator system 240 may include voice to text translator 250 and text to voice translator 260. Voice to text translator 250 may include any device for receiving incoming voice calls and translating the content to text. For example, voice to text translator 250 may include an automatic speech recognition and text generation program that recognizes the spoken words in an incoming call, and translates the spoken words to text. Similarly, text to voice translator 260 may include any device for receiving incoming text messages, and translating the text to speech. For example, text to voice translator 260 may include an automatic text recognition and speech generation program that recognizes the text in an incoming text message, and translates the text to spoken words.

Generally, in implementations described herein, call distributor 210 may detect available voicemail and text services. For example, in one implementation, call distributor 210 may query voicemail server 220 to determine the availability of voicemail services associated with the called number. In addition, call distributor 210 may query text distributor 230 to determine the availability of text messaging services associated with the called number. If call distributor 210 determines that text services are available to the called number, call distributor 210 may direct incoming calls to translator system 240. Translator system 240 may forward translated text to text distributor 230.

Although FIG. 2 shows exemplary components of voice/text system 160, in other implementations, voice/text system 160 may contain fewer, additional, different, or differently arranged components than depicted in FIG. 2. In still other implementations, one or more components of voice/text system 160 may perform one or more of the tasks described as being performed by one or more other components of voice/text system 160. Also, one or more components of voice/text system 160 may be located external to voice/text system 160, or components may be distributed throughout the system described herein.

Figure 3:
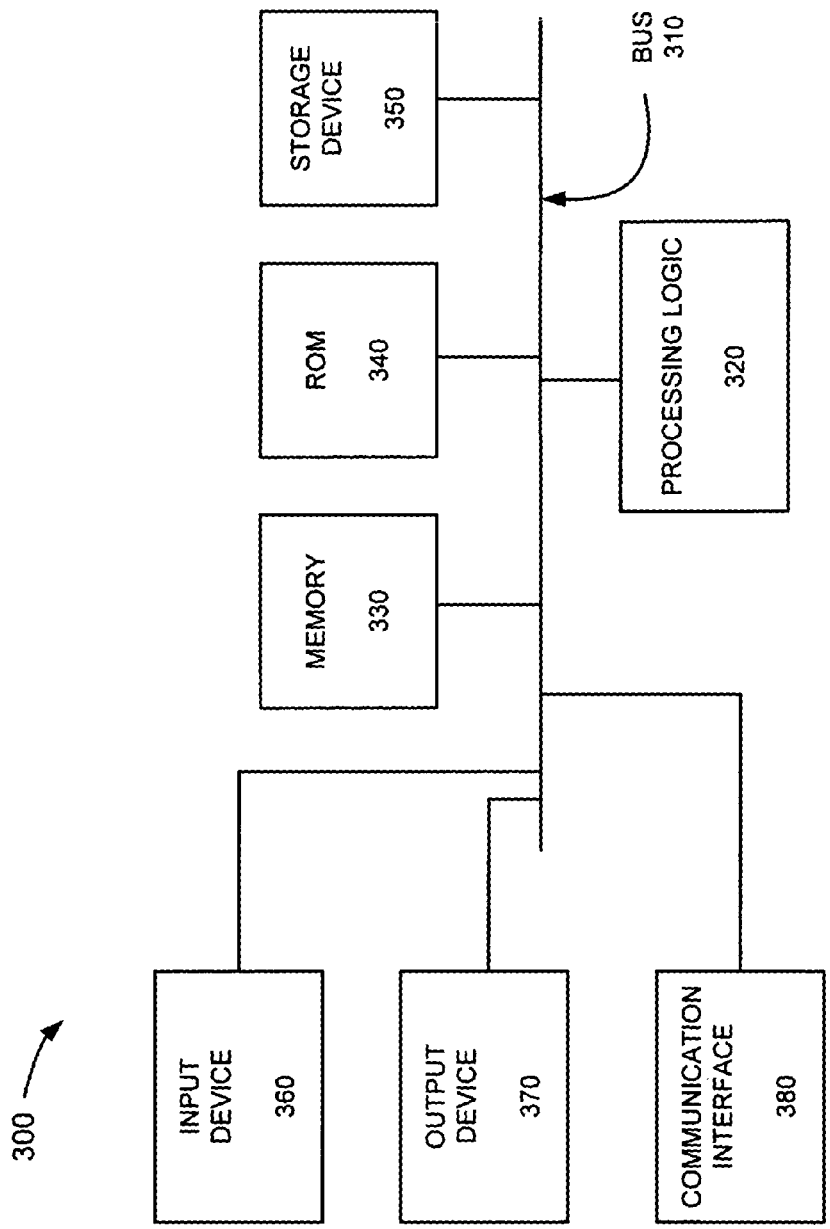
FIG. 3 is a diagram depicting an exemplary configuration of a device within the exemplary voice/text system depicted in FIG. 2.

FIG. 3 is a diagram depicting a device 300 within the exemplary voice/text system 160 depicted in FIGS. 1 and 2. Device 300 may correspond to call distributor 210, voicemail distributor 220, text distributor 230, and/or translator system 240. As shown in FIG. 3, device 300 may include a bus 310, processing logic 320, a memory 330, a read only memory (ROM) 340, a storage device 350, an input device 360, an output device 370, and a communications interface 380. It will be appreciated that device 300 may include other components (not shown) that aid in receiving, transmitting, and/or processing calls consistent with the voice and text communication system and/or methods described herein.

Bus 310 may permit communication among the components of device 300. Processing logic 320 may include any type of processor or microprocessor that may interpret and execute instructions. Memory 330 may include a random access memory (RAM) or another type of dynamic storage device that may store information and instructions for execution by processing logic 320. ROM may include a ROM device and/or another type of static storage device that stores static information and instructions for the processing logic 320. Storage device 350 may include a magnetic or optical recording medium and its corresponding hardware mechanism for storing information and/or instructions.

Input device 360 may include a device that permits an operator to input information to device 300, such as a microphone, a keyboard, a keypad, a mouse, a pen, or the like. Output device 370 may include a device that outputs information to the operator, such as a display, a speaker, etc.

Communication interface 380 may include any transceiver-like mechanism that enables device 300 to communicate with other devices and/or systems. For example, communication interface 380 may include mechanisms for communicating with another device or system via a network, such as voice network 130 or text network 140.

As described herein, device 300 may perform certain operations relating to the processing of voice and/or text communication. Device 300 may perform these and other operations in response to processing logic 320 executing software instructions contained in a computer-readable medium, such as memory 330. For example, processing logic 320 may execute a telephone number lookup program that is resident in memory 330. A computer-readable medium may be defined as one or more memory devices. The software instructions may be read into memory 330 from another computer-readable medium, such as data storage device 350, or from another device via communication interface 380. For example, data storage device 350 may contain specific operator data necessary for the processing of voice and/or text communication between operators. Such specific operator data may be searched through the execution of a lookup program that may be resident in memory 330. As another example, communication interface 380 may deliver to memory 330 software instructions for processing voice and/or text communication between operators.

The software instructions contained in memory 330 may cause processing logic 320 to perform processes that will be described later. Alternatively, hardwired circuitry may be used in place of or in combination with software instructions to implement processes described herein. Thus, systems and methods described herein are not limited to any specific combination of hardware circuitry and software.

Although FIG. 3 shows exemplary components of device 300, in other implementations, device 300 may contain include more, fewer, different, or differently arranged components than depicted in FIG. 3. In still other implementations, one or more components of device 300 may perform one or more of the tasks described as being performed by one or more other components of device 300.

Figure 4:
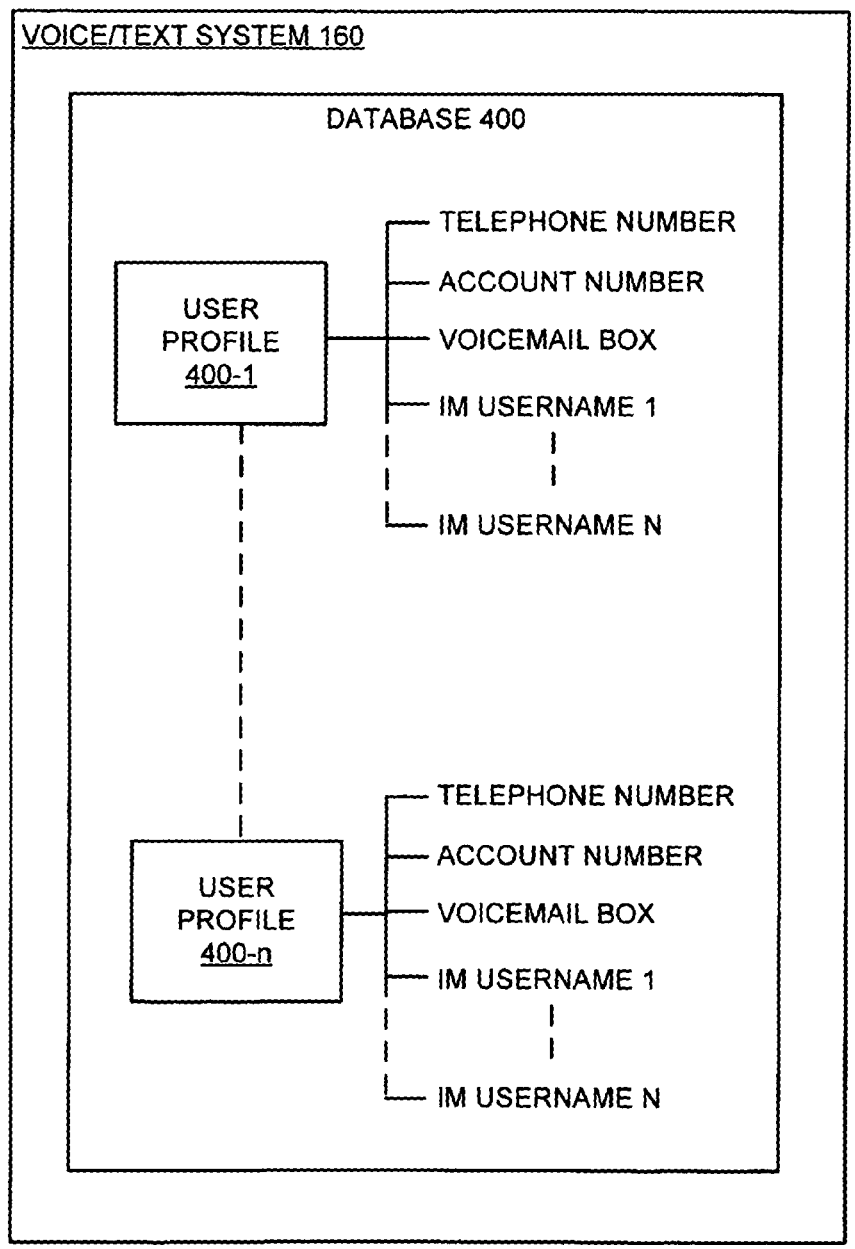
FIG. 4 is a diagram showing exemplary contents of a database that may be associated with an implementation of the voice/text system depicted in FIG. 2.

FIG. 4 is a diagram showing exemplary contents of database 400, that may be associated with an implementation of voice/text system 160. Database 400 may be stored in a single device, or it may be spread among multiple devices. As illustrated, database 400 may include a series of user profiles 400-1 through 400-n. User profiles 400-1 through 400-n may include information associated with the processing of voice and/or text communication between operators. For example, user profile 400-n may include telephone numbers, account numbers and associated account information, voicemail box information, and IM usernames, associated with the operation of exemplary device 300 as described herein. In an exemplary implementation, device 300 may access telephone number data in database 400 in order to identify incoming calls and further to identify and locate called telephone numbers. In addition, device 300 may access account information in database 400 in order to determine the availability of voicemail and text services associated with calling and called telephone numbers. Furthermore, device 300 may access data such as voicemail box number and instant message system username if voicemail and/or text services are available.

In one implementation of database 400, the operation of the voice/text system 160 may be linked to individual telephone numbers stored in database 400, so that when a call is made to a specific telephone number, that specific telephone number operator's presence on a text messaging system may be detected, and a caller may be offered the opportunity to connect to the telephone number operator via a text messaging system.

Although FIG. 4 shows exemplary contents of database 400, in other implementations, database 400 may contain more, fewer, different or differently arranged data than depicted in FIG. 4. Furthermore, as database 400 may be distributed among multiple devices, database 400 may include fewer, different, or additional data than those depicted in FIG. 4. For example, user profile 400-*n* may include other operator information including billing information, usage information, user preferences, and market research data.

Figure 5:
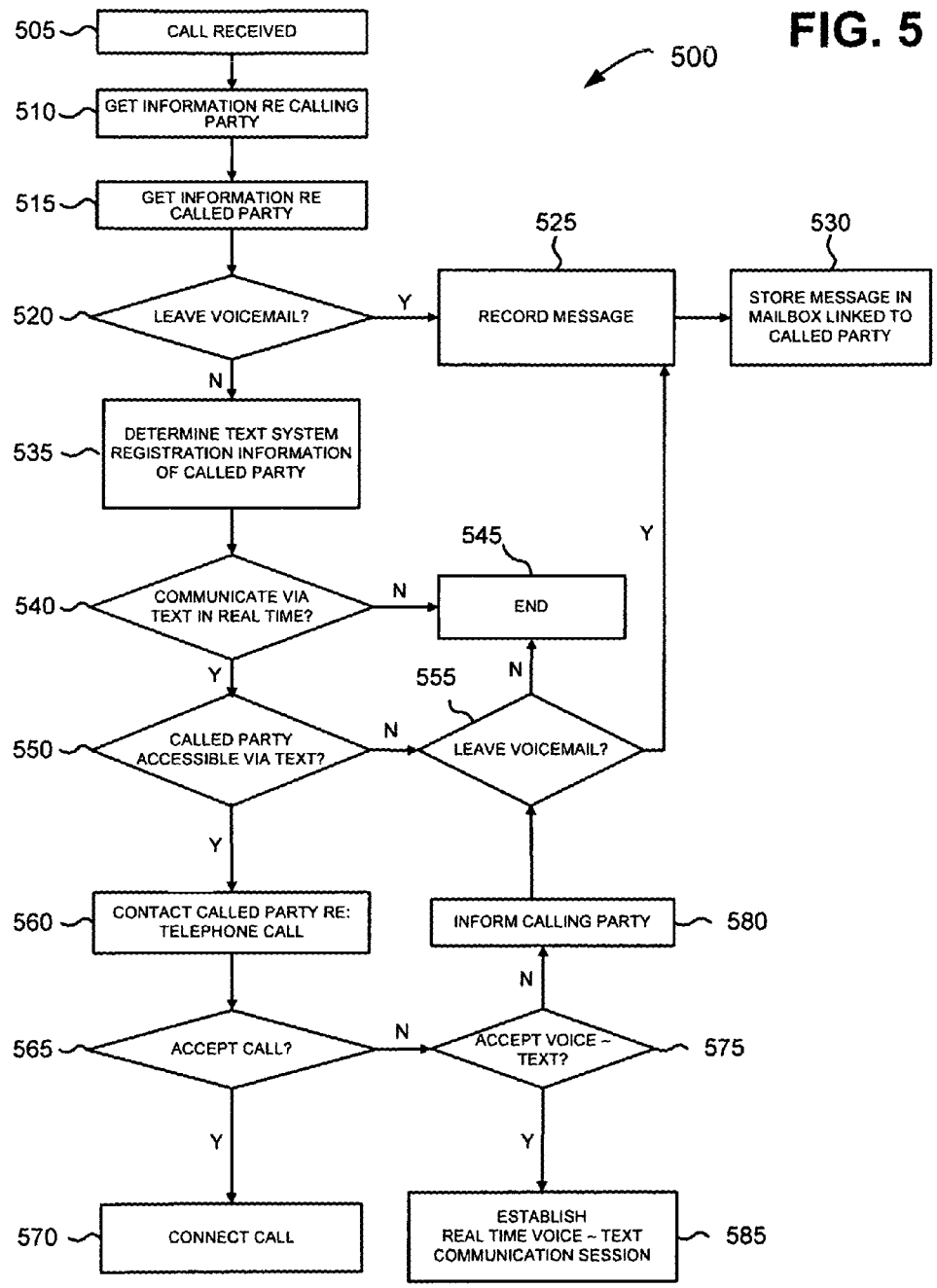
FIG. 5 is a flowchart of an exemplary process for connecting a voice caller to a text system user in real time.

FIG. 5 is a flowchart of an exemplary process 500 for connecting a voice caller to a text system user in real time. While the description to follow refers to a device 300, within voice/text system 160, as performing process 500, this need not be the case. In one implementation, one or more of the blocks of process 500 may be performed by a combination of devices.

The process of FIG. 5 may begin with a telephone call being received (block 505). For example, assume that a calling party, using calling device 110, places a telephone call to a called party at a telephone number associated with called device 120. Assume further that the called party does not answer the telephone call at called device 120. In this case, the telephone call may be routed to voice/text system 160 for further processing.

Information associated with the calling party may be determined (block 510). In one implementation, the information associated with the calling party may include a telephone number associated with calling device 110. In this case, for example, device 300 may detect a telephone number of calling device 110 based on caller identification (caller ID) information that is transmitted with the received telephone call. In another implementation, the information associated with the calling party may include a name associated with the calling party. In this case, for example, device 300 may detect the name of the calling party based on caller identification (caller ID) information that is transmitted with the received telephone call, or may request that the calling party provide the name.

Information associated with the called party may be determined (block 515). In one implementation, the information associated with the called party may include a telephone number associated with called device 1 10. In this case, for example, device 300 may detect a telephone number of called device 110 based on information that is transmitted with the received telephone call. In another implementation, device 300 may query voicemail server 220 and/or database 400 to determine a voicemail box location associated with the called telephone number. In a further implementation, the information associated with the called party may include an identifier (e.g., username) associated with the called party. In this case, for example, device 300 may request that the calling party provide the identifier.

The calling party may be offered the option to leave a voicemail message (block 520). In one implementation, device 300 may use information associated with the called party retrieved in block 515 to announce that the called party is unavailable. In this case, for example, device 300 may announce the name of the called party, and device 300 may further announce that the called party is unavailable, but that the calling party may leave a voicemail message for the called party.

Assume that the calling party accepts the offer to leave a voicemail message for the called party (block 520—YES). In this case, a voicemail message from the calling party may be recorded (block 525) and the recorded message may be stored in the voicemail box associated with the called party (block 530). In one implementation, device 300 may process the recording of the voicemail message and the sending of the voicemail message to voicemail server 220, along with the information associating the voicemail box with the telephone number of the called party. In this case, device 300 may use the voicemail box information acquired in block 515.

Now assume that the calling party does not desire to leave a voicemail message for the called party (block 520—NO). Device 300 system may investigate to determine whether the called party is eligible to be reached through a text message system. In one implementation, device 300 may determine the text system registration information of the called party (block 535). For example, the called party may be registered with one or more specific IM systems, each with a specific username. In this case, device 300 may employ the information acquired in block 515 to determine whether the called party is registered with any text message systems, and to determine the called party's associated username information for any such text systems.

Assume that device 300 has determined that the called party is registered with a text message system, and thus may be eligible for real time voice to text communication. In this case, the calling party may be offered the opportunity to communicate with the called party in real time, using text communication (block 540). In one implementation, device 300 may deliver a recorded message that the called party may be available via real time text messaging, and request a response from the calling party. In this case, device 300 may. In this case, for example, device 300 may include information acquired in block 515 in order to announce the name and/or text system username of the called. Further in this case, for example, device 300 may announce that the called party may be available via real time text messaging, and request a response from the calling party.

If the calling party refuses the opportunity to communicate via text messaging (block 540—NO), the call may be terminated (block 545). If the calling party instead accepts the offer to communicate with the called party via real time text communication (block 540—YES), device 300 may investigate the current text system status of the called party to determine whether the called party is active and/or available via text messaging (block 550). In one implementation, device 300 may employ the information acquired in block 515 to determine whether the called party is available to the calling party via a text message system.

A text message system user may have any of several statuses, each of which will affect the user's accessibility through the text message system. For example, if a user is not logged on to a text message system, that user will not be accessible through that text message system. Further, a user may be logged on and unavailable, where for example, the user may be actively blocking access by other text message system users. Other possible user statuses include logged on and active/available; logged on and busy; and logged on and idle. Furthermore, in some text messaging systems, user-specific information such as user elapsed time logged on and elapsed time idle may be available to device 300. In this case, device 300 may define a logged-on text system user who has been idle for less than 10 minutes to be active and available. Similarly, a logged-on text system user who has been idle for more than ten minutes may be defined as unavailable.

Assume that the called party is registered with several text communication systems, and device 300 has acquired the necessary username information regarding the called party. In one implementation, device 300 may investigate to determine if a specific username associated with the called party is actively logged on to a specific IM system. For example, the called party may have the username TEXTER1 associated with a specific IM system operated by Microsoft Corporation. In this case, device 300 would determine through 230 whether TEXTER1 is actively logged on to the IM system operated by Microsoft Corporation.

If, in this example, the called party/TEXTER1 is not accessible via the IM system operated by Microsoft (block 550—NO), the calling party may be offered the option to leave a voicemail message (block 555). In one implementation, device 300 may use information associated with the called party retrieved in block 515 to announce that the called party is unavailable via real time text messaging. In this case, for example, device 300 may announce the text system username of the called party, and may further announce that the called party is unavailable via real time text messaging, but that the calling party may leave a voicemail message for the called party.

If the calling party declines to leave a voicemail message after learning that the called party is unavailable through real time text messaging (block 555—NO), the call may be terminated (block 545). Otherwise, the calling party may record a voicemail message (block 525) and the recorded message may be stored in the voicemail box associated with the called party (block 530), in the manner described herein.

If the inquiry in block 550 determines that called party is accessible on a specific text messaging system (block 555—YES), the called party may be contacted regarding the incoming telephone call (block 560). In one implementation, device 300 may send a text message to the called party, announcing the calling party. Device 300 may further include in the text message information regarding the calling party collected in block 510. In this example, the called party may receive a text message indicating that the calling party is attempting to connect with the called party's telephone.

Further in process 500, device 300 may inquire whether the called party will accept the incoming telephone call (block 565) In one implementation, device 300 may include information regarding the calling party and called party that device 300 collected in blocks 510 and 515. In this example, the called party with username TEXTER1 may receive the message "you have an incoming telephone call from 123-234-3456, do you wish to take the telephone call?" Further in this example, device 300 may include in the text message other information, such as the calling party's name, that device 300 may have collected in block 510.

Assume in this example that the called party is able and willing to accept the telephone call (block 565—YES). In one implementation, process 500 may include connecting the call to the called party's telephone (block 570). In this case example, device 300 may send other information, such as the calling party's name, that device 300 may have collected in block 510.

Now assume that the called party responds to the incoming text message that he will not or cannot accept the incoming telephone call (block 565—NO). Process 500 may continue by inquiring if the called party will accept real time voice-text communication from the calling party (block 575). In one implementation, device 300 may send a text message via text distributor 230 that may include calling party information collected by device 300 in block 510. For example, device 300 may send a text message to the called party that includes information collected from the calling party's caller ID information in block 510. In this case, device 300 may send the text message "will you accept a real time voice-to-text message from 123-234-3456?" Further in the example, device 300 may include other information, such as the calling party's name, that device 300 collected in block 510.

If the called party declines the offer to establish a real time voice-to-text communication session with the calling party (block 575—NO), process 500 may continue by informing the calling party that real time voice-to-text communication with the called party is not available (block 580). In one implementation, device 300 may send an audible signal and/or a recorded message to the calling party that real time voice-to-text communication with the called party is unavailable. In this case, the audible signal sent by device 300 may include called party information collected by device 300 in block 515. Process 500 may then include offering the calling party the option to leave a voicemail message (block 555). In one implementation, device 300 may announce the username of the called party, and device 300 may further announce that the called party is unavailable via real time text messaging, but that the calling party may leave a voicemail message for the called party.

If the calling party declines to leave a voicemail message after learning that the called party is unavailable through real time text messaging (block 555—NO), the call may be terminated (block 545). Otherwise, the calling party may record a voicemail message (block 525) and the recorded message may be stored in the voicemail box associated with the called party (block 530), in the manner described herein.

When the called party's response to the inquiry in block 585 is to accept real time voice-to-text communication from the calling party, process 500 may establish a real time voice-to-text communication session between the calling party and the called party (block 595). In one implementation, device 300 may direct call distributor 210 to deliver the call from the calling party to translator system 240, where voice-text translator 250 may convert the calling party's speech to text for delivery at the called party's text messaging system, via text distributor 230. In this case, the real time voice-to-text message may include calling party information collected from the calling party in block 510. For example, a real-time voice-to-text message from the calling party may include the calling party's name and/or telephone number. Further in the implementation, the established real time voice-to-text communication session may include delivery of text message responses from the called party to the calling party. For example, device 300 may direct that the text message response from the called party be delivered by text distributor 230 to translator 240, where text-voice translator 260 may convert the text message to speech, for delivery via call distributor 210 to the calling party as a real time voice message. In this case, the translated response from the called party may include called party information collected in block 515. For example, the translated text-to-voice message delivered to the calling party may include the called party's name, telephone number, and/or username.

Although FIG. 5 shows exemplary blocks representing sequential steps of a process capable of being performed by voice/text system 160 employing components of voice/text system 160 and device 300, in other implementations the process depicted in FIG. 5 may include additional fewer, different, or differently arranged steps than depicted in FIG. 5. Furthermore, one or more components of voice/text system 160 and/or device 300 may perform one or more of the tasks described as being performed by one or more other components of voice/text system 160 and/or device 300, in the process depicted in FIG. 5.

Figure 6:
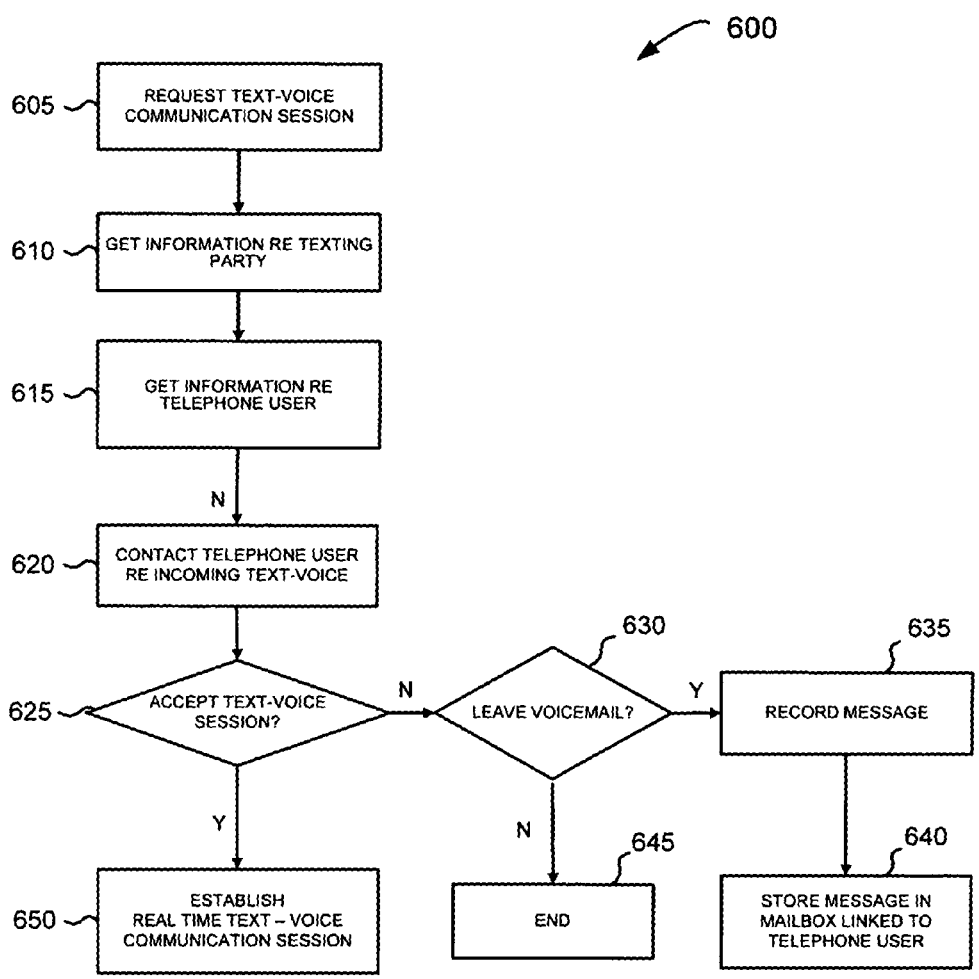
FIG. 6 is a flowchart of an exemplary process for connecting a text system user to a telephone user in real time.

FIG. 6 is a flowchart of an exemplary process 600 for connecting a text system user to a telephone user in real time. While the description to follow refers to a device 300 within voice/text system 160, as performing process 600, this need not be the case. In one implementation, one or more of the blocks of process 600 may be performed by a combination of devices.

The process of FIG. 6 may begin with a text user requesting to establish a text-to-voice communication session in real time (block 605). Assume that a text system user, using text device 150, is logged on and active in a text messaging system connected to text network 140. In one implementation, the text system user may enter a specific text character or string of characters that serves to initiate the request. In this case, the text system user may enter the message "call 123-234-3456" in the text system user's text messaging system. In one implementation, the text system user may send the initiating text to voice/text system 160. In another implementation, voice/text system 160 may be integrated in the text messaging system, and by simply entering the text the user may initiate the request.

Information associated with the text system user may be collected (block 610). In one implementation, the information associated with the text system user may include a username and/or a telephone number associated with the text system user. For example, text device 150 may include both text message and telephone capabilities.

Assume that the telephone number 123-234-3456 is associated with a telephone user employing telephone device 110. Information associated with the telephone user may be determined (block 615). In one implementation, the information associated with the telephone user may include information associated with the telephone device 110. In this case, for example, device 300 may confirm the telephone number of calling device 110 based on caller identification (caller ID) information that is linked to the telephone number. In another implementation, the information associated with the calling party may include a name associated with the telephone user.

The telephone user may be contacted regarding the incoming text-to-voice telephone call (block 620). In one implementation, device 300 may send, to the telephone user, an announcement that the text system user wishes to establish a real time text-to-voice communication session. Device 300 may further include, in the announcement, information collected in block 610 regarding the text system user. In this example, the telephone user may receive a telephone call announcing the name and/or username of the text system user, and indicating that the text system user wishes to establish a real time text-to-voice communication session.

Further in process 600, device 300 may inquire whether the telephone user will accept the incoming real time text-to-voice communication (block 625). In one implementation, device 300 may include information regarding the text system user and telephone user that device 300 collected in blocks 610 and 615. In this example, the telephone user may receive the message "TEXTER1 is calling 123-234-3456, do you wish to accept the text-to-voice call?"

If, in this example, the telephone user responds to the incoming message that he will not or cannot accept the incoming text-to-voice call (block 625—NO), the text system user may be offered the option to leave a text-to-voice voicemail message (block 630). In one implementation, device 300 may use information associated with the called party retrieved in block 615 to announce that the called party is unavailable. In this case, for example, device 300 may announce the name of the called party, and device 300 may further announce that the called party is unavailable, but that the text system user may leave a voicemail message for the called party. Further in the example, device 300 may include other information, such as the calling party's name, that device 300 collected in block 615.

Assume that the text system user accepts the offer to leave a voicemail message for the called party (block 630—YES). In one implementation, text distributor 230 may deliver text from the text system user to translator system 240, where text-voice translator 260 may convert the text system user's text to speech for delivery to call distributor 210 and voicemail server 220. In this case, device 300 may use the voicemail box information acquired in block 615. The text-to-voice translated voicemail message from the text system user may be recorded (block 635) and the recorded message may be stored in the voicemail box associated with the telephone user (block 640). In this case, device 300 may use information acquired in block 615 associating the voicemail box with the telephone user's telephone number. If the text system user refuses the opportunity to leave a voicemail message for the telephone user (block 630—NO), the connection may be terminated (block 645).

If the telephone user responds so as to accept real time text-to-voice communication from the text system user (block 625—YES), process 600 may establish a real time text-to-voice communication session between the text system user and the telephone user (block 650). In one implementation, call text distributor 230 may deliver text from the text system user to translator system 240, where text-voice translator 260 may convert the text system user's text to speech for delivery at the telephone user's telephone, via call distributor 210. In this case, the delivered text-to-voice message may include text system user information collected from the text system user in block 610. For example, a real-time text-to-voice message from the text system user may include the text system user's name, text system username, and/or telephone number. Further in the implementation, the established real time text-to-voice communication session may include delivery of translated voice-to-text message responses from the telephone user to the text system user. For example, the voice response from the telephone user may be provided by call distributor 210 to translator 240, where voice-text translator 250 may convert the telephone user's speech to text, for delivery via text distributor 230 to the text system user as a real time voice-to-text message. In this case, the translated response from the telephone user may include telephone user information collected in block 615. For example, the translated voice-to-text message delivered to the text system user may include the telephone user's name, telephone number, and/or username.

Although FIG. 6 shows exemplary blocks of a process capable of being performed by text/voice system 160 and/or device 300 employing components of text/voice system 160 and/or device 300, in other implementations the process depicted in FIG. 6 may include different, additional, or fewer blocks than depicted in FIG. 6.

The foregoing description of blocks included in FIG. 5 and FIG. 6 provides illustration and description, but is not intended to be exhaustive or to limit the embodiments to the precise form disclosed. Modifications and variations are possible in light of the above teachings or may be acquired from practice of the invention. While series of blocks have been described with regard to the flowcharts of FIGS. 5 and 6, the order of the blocks may differ in other implementations. For example, the offer of voicemail service (block 530 and block 555) may be made at any of multiple times during process 500. In one embodiment, an offer of voicemail service may be made prior to detecting text system activity by the user of the called telephone number at step 550. In a similar manner, in process 600, the offer of voicemail service (block 630) may be made at any of multiple times during process 600. Further, non-dependent acts may be performed in parallel.

By repeating either process 500 or process 600, a conversation between a telephone user and a text system user may continue indefinitely.

A receiver of the text message may respond in a manner similar to that described herein. The telephone caller may be calling over an analog voice line, or a digital telephone network. The text messaging system may be a telephone-based short message system implementation, or it may be a computer-based instant messaging system. The instant messaging system may be a self-contained instant messaging network, an internet chat application, or an instant messaging feature of another application, such as an online role-playing game or a social network.

In an exemplary operation of the system, a telephone user may be incapable of communicating via text messaging, for any of a variety of reasons. For example, the telephone hardware might not include text messaging capability, the telephone network might not be capable of transmitting text messages, or the telephone user might not have the physical dexterity required for entering text messages, among other reasons. Furthermore, a telephone user might refuse to send or receive text messages as a matter of personal preference. As described herein, such a telephone user is able to communicate with a text system user in real time, without needing to enter any text. In such an exemplary operation, a telephone caller may call another telephone user, intending to deliver a reminder of an impending appointment. The telephone caller may receive a voicemail greeting, which offers the caller the option to leave a voicemail message, or to connect to the telephone user's text messaging system. In the exemplary operation, the telephone caller may elect to connect to the text messaging system. In a further exemplary aspect, the text system user may receive a text message announcing the connection from the telephone caller. For example, the text system user may be presented with the message "CALLER, calling from 123-234-3456 would like to send a message, do you accept (type Y or N)?" In the exemplary implementation, if the text system user responds by typing "Y," the caller may receive a signal or instructions to proceed, whereupon the telephone caller may simply speak the message, for example "you have a dentist appointment at 2 p.m." In the exemplary implementation, the spoken message will be translated to text, and will appear on the text system user's display as "you have a dentist appointment at 2 p.m."

Further in the exemplary operation of the system, the text system user may respond to the incoming message by entering a text message reply, for example "I remember, I will call you when I arrive there." The text system user's text message will thereupon be translated to speech, and the telephone caller will hear the voice message "I remember, I will call you when I arrive there." At that point, the telephone caller may terminate the call, having delivered and received messages in real time.

In another exemplary implementation of the system, a text system user might not have a telephone accessible while he or she is logged on to a text messaging system. For example, a text message system user might be in a meeting where telephone use is unavailable, or a text system user might be logged on from a remote location with no telephone access, such as a restaurant that offers internet access. In such exemplary circumstances, the lack of telephone availability might be due to inadequate cell system signal, or the text system user might not have a cell telephone with him. In the exemplary implementation, a telephone user might call a telephone number associated with the text system user, whereupon the telephone caller may receive a voicemail greeting, which offers the caller the option to leave a voicemail message, or to connect to the telephone user's text messaging system. In the exemplary operation, the telephone caller may elect to connect to the text messaging system, whereupon the caller may simply speak the message, for example "where are you?" The spoken message will be translated to text, and will appear on the text system user's display as "where are you?" In the exemplary implementation, the text system user may respond with the text message "I'm at Restaurant A, can you meet me here?" The text system user's message may then be translated to voice, and the telephone caller may receive the voice message "I'm at Restaurant A, can you meet me here?" Further in the exemplary implementation, the telephone caller may respond by voice, for example "I can meet you there at 2 p.m." The operation of the system permits such a dialogue between telephone user and text system user to continue indefinitely.

In another exemplary implementation of the system, a text messaging system user might have no telephone available, but might wish to reach a telephone user. In the exemplary implementation, the text system user may enter a text message that will permit him to communicate in real time with a telephone user. For example, the text system user may enter the text message "call CALLER at 123-234-3456" thereby initiating a call to the telephone user. The text system user may see status messages such as "ring ring" and "answer." Further in the exemplary system, upon answering, the telephone user may receive a voice message announcing the incoming message from the text system user. For example, the telephone user may hear the greeting "TEXTER1 is calling CALLER." In an exemplary aspect of the system, the telephone user may be offered the choice of accepting the incoming message, rejecting the incoming message, or directing the incoming message to voicemail. In yet a further exemplary aspect of the system, the telephone user may direct the incoming message to the telephone user's own text messaging system. If the telephone user accepts the incoming message, the text system user may enter the text message "my meeting ends at 2 p.m. Can you meet me at Restaurant A at 2:30?" The telephone user may respond with the voice message "I can meet you at Restaurant A, but not until 3 p.m." The telephone user's voice response will be translated and will appear as text message "I can meet you at Restaurant A, but not until 3 p.m." As described herein, the operation of the system permits such a dialogue between telephone user and text system user to continue indefinitely.

In yet another exemplary implementation of the system, a telephone caller may wish to reach multiple text message system users simultaneously. Such a situation may arise when a telephone caller desires to contact multiple users of an internet-based chat system, whether the chat system is a standalone system, or integrated in another internet-based application such as an online role-playing game, or a social network. In the exemplary implementation, a parent may wish to deliver a message to several children who are logged on to the role playing game or social network. In the exemplary implementation, the parent may call the home telephone number, and may receive a voicemail greeting, which offers the parent the option to leave a voicemail message, or to connect to the chat system linked to the home telephone number. In the exemplary operation, the parent may elect to connect to the chat system. In a further exemplary aspect, the chat system users may receive a text message announcing the connection from the parent. For example, the chat system may open a separate chat window for each connected online chat user, with the message "PARENT, calling from 123-234-3456 has entered." In another exemplary aspect of the implementation, the parent may receive a voice message announcing the identities of the chat participants. For example, the parent may receive a voice message "USERNAME1, USERNAME2, and USERNAME3 are present." Further in the exemplary implementation, the parent may simply speak the message, for example "are you ready for practice at 2 p.m?" In the exemplary implementation, the spoken message will be translated to text, and will appear on the chat system users' displays as "are you ready for practice at 2 p.m?" Further in the exemplary implementation, one of the chat system users may respond with a text message "do you have the gear I left in your car last week?" The text message may appear on other chat system users' displays, as well as being translated to voice and delivered to the parent's telephone as a voice message "do you have the gear I left in your car last week?" As described herein, the operation of the system permits a real time conversation between a telephone user and a text system user to continue indefinitely.

In still another exemplary implementation of the system, a text user may communicate in real time with a telephone user's text messaging system. For example, a text message system user might not know a coworker's text message user name, but knows the coworker's telephone number. In the exemplary implementation, the text system user may enter a text message that will permit him to communicate in real time with the coworker. For example, the text system user may enter the text message "call COWORKER at 123-234-3456" thereby initiating a call to the coworker's telephone. The text system user may see status messages such as "ring ring" and "answer." Further in an exemplary aspect of the system, the coworker may be offered the choice of accepting the incoming message, rejecting the incoming message, or directing the incoming message to voicemail. In yet a further exemplary aspect of the system, the coworker or the voicemail system may direct the incoming message to the coworker's own text messaging system. Upon being directed to the coworker's text messaging system, the text system user may receive the text message "you are connected to COWORKER in TEXT MESSAGE SYSTEM." Further in the exemplary system, the text user may enter the text message "can you join my meeting at 2 p.m?" In the exemplary implementation, the coworker would immediately receive the text message "can you join my meeting at 2 p.m?" Further in the exemplary implementation, the coworker may respond with the text message "I can join your meeting, but not until 2:15 p.m." In the exemplary implementation, the text system user would immediately receive the coworker's text message "I can join your meeting, but not until 2:15 p.m." As described herein, the operation of the system permits a dialogue between the text system user and the coworker to continue indefinitely.

The concept of real time communication has been described. It should be understood that the concept of real time communication as described herein is intended to refer to communication that may approximate the pace of dialogue that may take place over a telephone or an instant messaging system. As such, real time communication as described herein may include time lags for such operations as typing and translation of text to speech or speech to text.

Certain terms, such as "voice message," "speech," and "speech message" have been referred to above. It should be understood that these terms are intended to be interchangeable. Also, terms referring to "speech to text translation" and "voice to text translation" are equivalent, and refer to the same concept. Similarly, terms referring to "text to speech translation" and "text to voice translation" are equivalent, and refer to the same concept. Furthermore, certain terms such as "text," "text message," "instant message," and "chat message" have been referred to above, and it should be understood that these terms are intended to be interchangeable.

It will be apparent that aspects described above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

It should be emphasized that the term "comprise," "comprises," "comprising," "include," "includes," or "including" when used in the specification is taken to specify the presence of stated features, integers, steps, or components, but does not preclude the presence or addition of one or more other features, components, steps, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Furthermore, the phrase "based on" is intended to include "based, at least in part, on" unless explicitly stated otherwise.

What is claimed is:

1. A system comprising:
a device to:
   receive a voice call from a calling party device intended for a called party device;
   detect, based on receiving the voice call, a current status of the called party on a text messaging system, the current status including active or inactive;
   establish a communication session between the calling party device, the called party device, and one or more other called party devices via the text messaging system when the current status of the called party is active,
      the one or more other called party devices being different than the called party device;
   receive, during the communication session, speech, associated with the voice call, from the calling party device;
   translate, during the communication session, the speech from the calling party device to text;
   deliver, to the called party device and the one or more other called party devices, the text on the text messaging system;

receive, during the communication session, text from the called party device;
translate, during the communication session, the text from the called party device to speech;
deliver, to the calling party device, the speech; and
deliver, to the one or more other called party devices, the text from the called party device.

2. The system of claim 1, where the device is further to:
detect and measure an elapsed time since the called party device has transmitted text; and
determine the current status of the called party based on the measured elapsed time.

3. The system of claim 2, where the device is further to:
change the current status of the called party based on the measured elapsed time.

4. The system of claim 1, where the text messaging system is one of an instant messaging system, an internet chat room, or a short message system.

5. The system of claim 1, where the device is further to:
offer voicemail service to at least one of the calling party device or the called party device.

6. A device comprising:
a processor to:
receive a voice signal from a device of a calling party intended for a first device of a called party;
determine a current status of the called party on a text messaging system;
translate the voice signal to text when the current status of the called party indicates that the called party is available on the text messaging system;
deliver the text to a second device of the called party and a device of another called party,
the device of the other called party being different than the first device of the called party and being different than the second device of the called party;
receive responsive text from the second device of the called party;
translate the responsive text to speech;
deliver the speech to the device of the calling party; and
deliver the responsive text to the device of the other called party.

7. The device of claim 6, where the second device is the first device.

8. The device of claim 6, where the processor is further to:
assign the current status of the called party on the text messaging system, where the current status includes active, idle, and inactive; and
where the called party is available when the current status is active.

9. The device of claim 8, where the processor is further to:
detect entry of text by the called party on the text messaging system;
measure an elapsed time since the entry of the text by the called party on the text messaging system; and
assign the current status of the called party on the text messaging system based on the measured elapsed time.

10. The device of claim 9, where the processor is further to:
establish a threshold quantity of elapsed time since the entry of the text by the called party on the text messaging system; and
change the current status of the called party to indicate that the called party is unavailable when the measured elapsed time exceeds the threshold quantity of elapsed time.

11. The device of claim 10, where the processor is further to:
change the current status of the called party to active when another entry of text by the called party is detected after the measured elapsed time exceeds the threshold quantity of elapsed time.

12. The device of claim 6, where the processor is further to:
provide voicemail service to at least one of the device of the calling party device or the first device of the called party.

13. The device of claim 7, where the processor is further to:
provide an announcement, associated with the device of the calling party, to the first device of the called party.

14. The device of claim 13, where the first device of the called party responds to the announcement with at least one response from the following:
accept;
reject;
block all texts from the device of the calling party; or
request information from the device of the calling party.

15. A method comprising:
receiving, by a device and from a device of a calling party, a voice call intended for a device of a called party;
identifying, by the device, an availability of the called party;
establishing, by the device, a communication session between the device of the calling party, a device of another called party, and the device of the called party when the called party is available,
the device of the other called party being different than the device of the called party;
translating, by the device, speech, associated with the voice call, to text
delivering, by the device and during the communication session, the text to the device of the called party and the device of the other called party;
receiving, by the device, a text response from the device of the called party;
translating, by the device, the received text response to speech;
delivering, by the device, the speech to the device of the calling party during the communication session; and
delivering, by the device and to the device of the other called party, the received text response during the communication session.

16. The method of claim 15, further comprising:
assigning a current status of the calling party, where the current status includes active, idle, and inactive, and
where the calling party is available when the current status is active.

17. The method of claim 16, further comprising:
detecting an entry of text by the calling party;
measuring an elapsed time since the entry of text by the calling party; and
assigning the current status of the calling party based on the measured elapsed time.

18. The method of claim 17, further comprising:
establishing a threshold quantity of elapsed time since the entry of text by the calling party; and
changing the current status of the calling party to indicate that the calling party is unavailable when the measured elapsed time exceeds the threshold quantity of elapsed time.

19. The method of claim 18, further comprising:
changing the current status of the calling party to active when another entry of text by the calling party is detected after the measured elapsed time exceeds threshold quantity of elapsed time.

20. The method of claim 17, further comprising:
offering voicemail service to at least one of the device of the calling party or the device of the called party.

\* \* \* \* \*